T. J. MURPHY.
ELECTRICITY RECTIFIER.
APPLICATION FILED MAR. 15, 1910. RENEWED MAY 28, 1915.

1,168,538.

Patented Jan. 18, 1916.
4 SHEETS—SHEET 1.

WITNESSES:
David J. Halsh
M. A. Butler

INVENTOR
Thomas J. Murphy
BY
F. F. Crampton
ATTORNEY

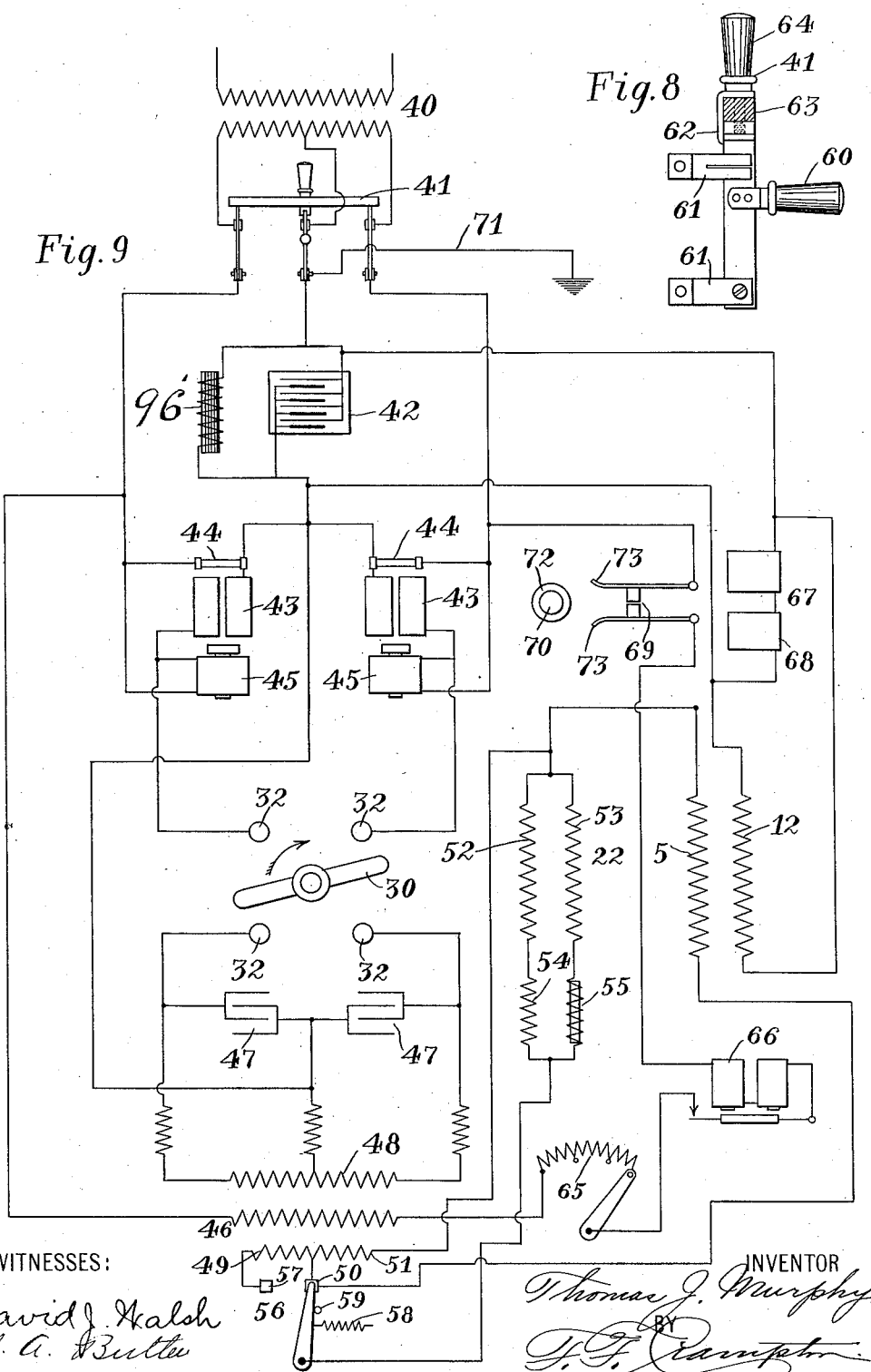

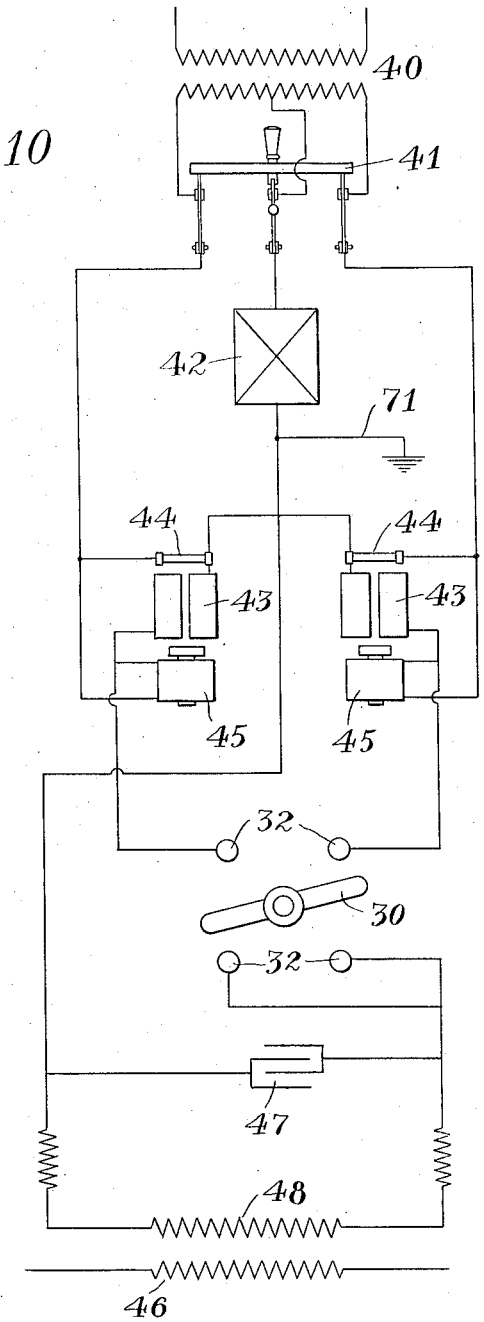

UNITED STATES PATENT OFFICE.

THOMAS J. MURPHY, OF ROCHESTER, NEW YORK.

ELECTRICITY-RECTIFIER.

1,168,538. Specification of Letters Patent. Patented Jan. 18, 1916.

Application filed March 15, 1910, Serial No. 549,467. Renewed May 28, 1915. Serial No. 31,083.

*To all whom it may concern:*

Be it known that I, THOMAS J. MURPHY, a subject of the King of Great Britain, and whose residence is Rochester, State of New York, have invented a new and useful Improvement in Electricity-Rectifiers, of which the following is a specification.

My invention relates to the rectification of electric currents or pulses and it has for its object to produce a motor which will operate in unison with the variations and pulsations produced by the source of electricity and to produce an efficient system for the rectification of electric currents and pulses.

In my invention I produce a synchronous light running motor. In the rectification of a variable current the motor moves in unison with the changes of the electricity. When used for that purpose it is connected with or it carries a suitable device which will coöperate in the system to rectify the current. I preferably connect the rotor with a conductor which causes the circuit in which the current to be rectified passes, to be completed at a desirable time. The motor is exceedingly light running and very responsive to the actuating current and it therefore may be used for any purpose for which such a motor may be found to be desirable whether in the rectification of an electric current or otherwise. In the preferred form of system in which the current is rectified the resistance or medium between a pair or pairs of electrodes is reduced or rendered conductive in unison with the changes of the current, so that the current is allowed to flow in a part of the circuit unidirectionally.

Figure 1:
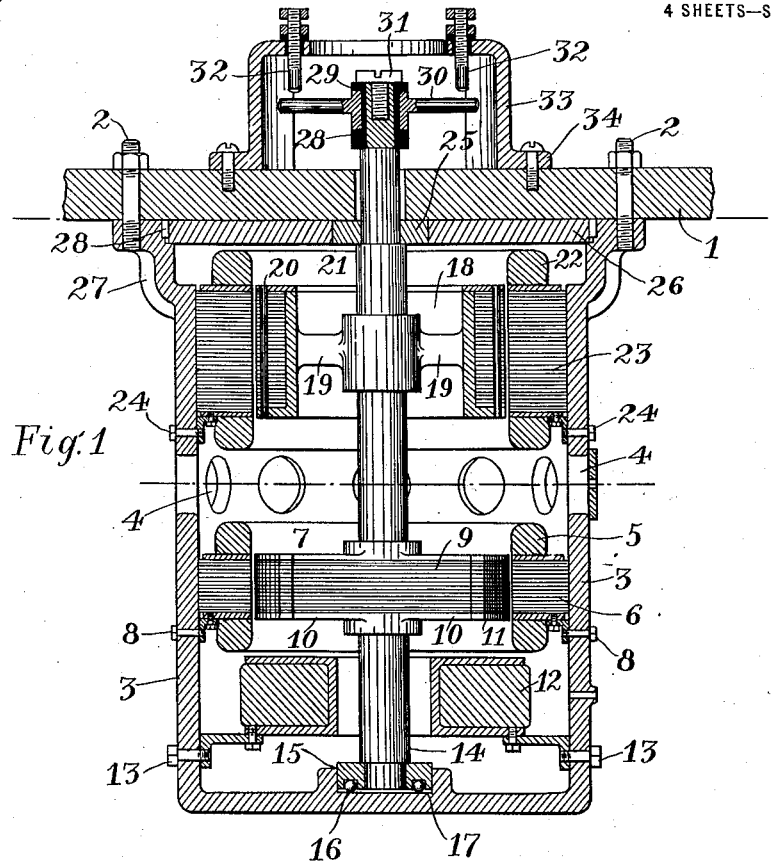
Figure 2:
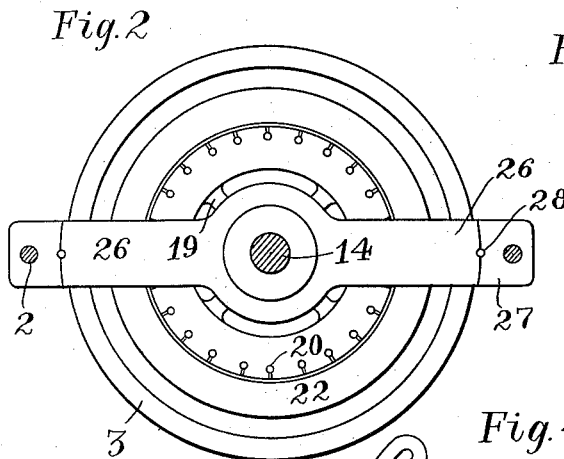
Figure 3:
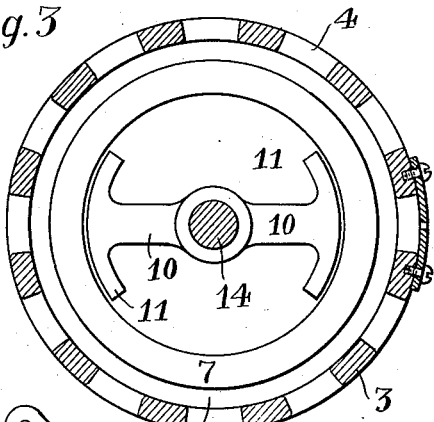
Figure 4:
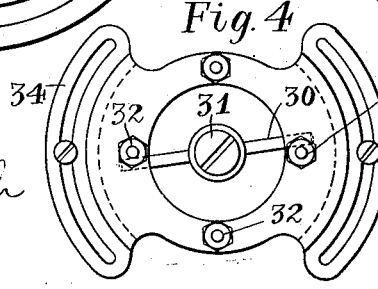
Figure 5:
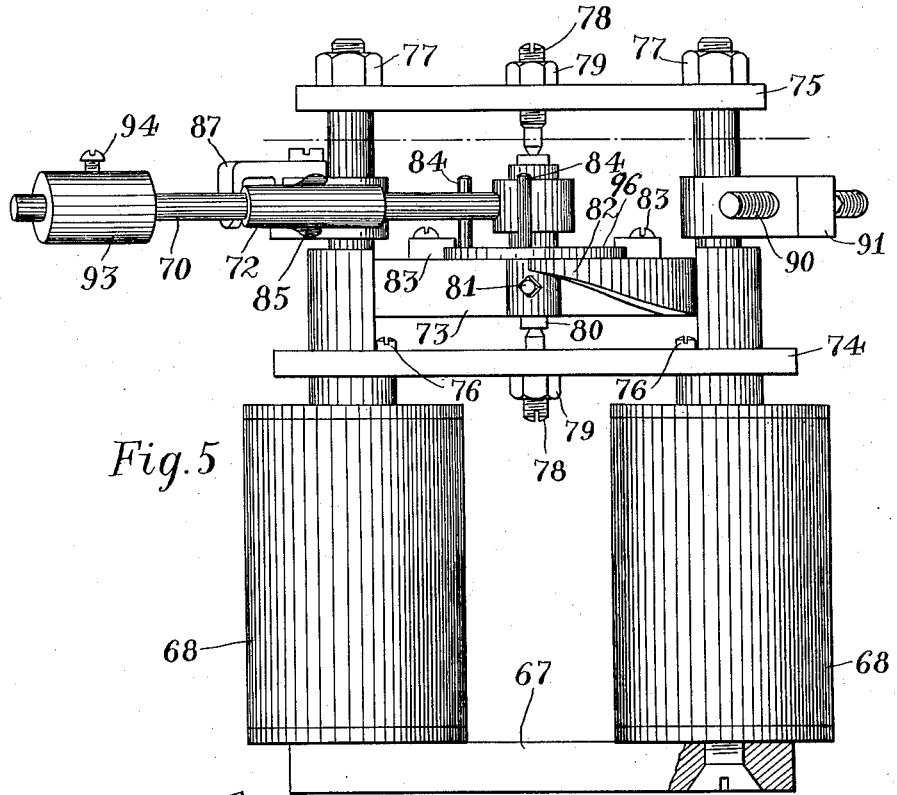
Figure 6:
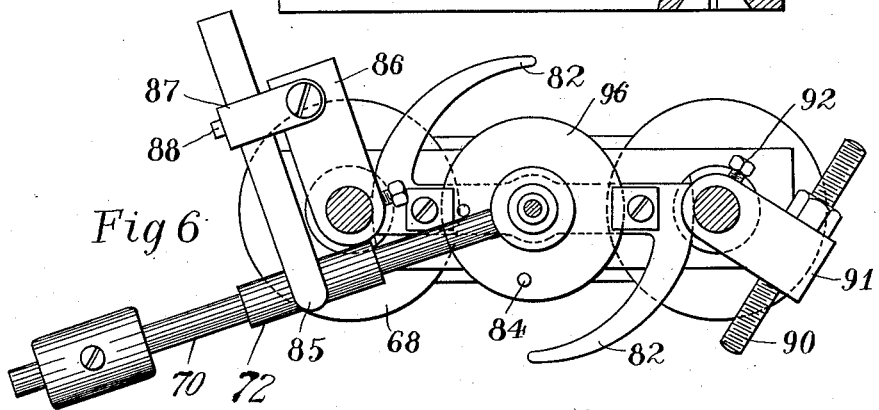
Figure 7:
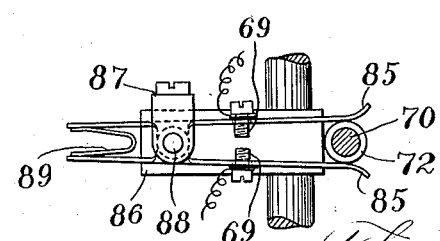

Referring to the drawings, Figure 1 illustrates a section of the motor. Fig. 2 illustrates an end view and Fig. 3 illustrates a transverse sectional view of the motor. Fig. 4 illustrates the synchronously operated device. Fig. 5 illustrates a side view of the electric controller for the motor and the rectifier. Fig. 6 illustrates a top view of the electric controller. Figs. 7 and 8 illustrate details shown in Fig. 6. Fig. 9 is a diagram showing the connections of the rectifier of electric currents. Fig. 10 is a diagram of a modified system.

The motor shown in Fig. 1 is secured to the support 1 by means of the nuts and bolts 2. It is located in a casing 3 having openings 4 to permit circulation of air. It has the usual stator 7 comprising the coil 5 and laminated magnetic field 6 through which the coil is threaded and if connected with a source of alternating current it forms a four pole moving field in the manner well known in the art. The stator 7 is supported in the casing and is attached thereto by any suitable means such as the bolts and brackets 8. The rotor 9 has radial arms 10 having the poles or magnetic terminals 11, which present broad surfaces to the stator 7 and are adapted to bridge the proper number of coils of the stator to produce the actuating torque.

The radial arms 10 are magnetized. I find it preferable to magnetize the arms and keep them magnetized by means of a direct current coil 12 which is magnetically connected with the radial arms. I find it preferable to attach the coil 12 to a stationary part of the apparatus. I have shown the coil 12 secured to the casing 3 by any suitable means such as the bolts and brackets 13. In the device shown the shaft 14 of the rotor of the synchronous motor passes through and is freely movable in the coil 12. The radial arms 10 are attached to the shaft 14 so that the ends of the radial arms constitute terminals of the magnetic circuit that is produced by the direct current coil 12. It passes through the shaft and radial arms of the rotor and the shell or casing. The outer ends of the rotor will thus be magnetized and moreover they will be magnetized with the same kind of magnetism.

The shaft 14 is stepped into the collar 15 which is provided with ball bearings 16 and is contained in a recess 17 formed in the casing 3.

A means is provided for starting the motor and increasing its speed up to the frequency of the variations of the actuating current and prevent "hurting" of the motor. In order to accomplish this I have connected an induction motor to the rotor of the synchronous motor. The shaft of the induction motor may be connected to the shaft of the synchronous motor. I have shown the shafting of the two motors as one piece, so that the rotor of the induction motor is attached to the shaft 14. The rotor 18 of the induction motor is of the usual squirrel-cage type and is attached to the shaft 14 by means of the arms 19. It has the usual connecting rods and plates 20. A stator 21 is provided with the usual coil 22 and the magnetic field 23. The stator may be attached to the casing 3 by means of the bolts and brackets 24. The coil 22 is a split phase coil consisting of two parts, one part having inductance and the other part having resistance which is hereinafter described in connection with the diagram shown in Fig. 9.

The shaft 14 rotates in a bearing 25 which is supported in the cross bar 26. The cross bar 26 is supported in the brackets 27 of the casing 3. If desired the ends of the cross bar 26 may be cut circular and rotation prevented by means of pins 28. Any suitable lugs may be used for securing the cross beam 26 or it may be fitted into recesses formed in the brackets 27.

The controller which coöperates with the rectifying system is connected to the shaft 14. This consists of a conductor which is mounted upon and insulated from the shaft, and is rotated in the vicinity of terminals 32 which are connected to the other devices of the rectifier. The shaft 14 extends upward through the supporting frame or shelf 1 and is provided with an insulating collar 28, 29 which supports the cross rod 30. The rod 30 extends across the end of the shaft 14 and is secured in position by means of the screw 31. The rod 30 moves in proximity to the terminal or terminals 32. The terminals 32 are supported in a frame 33 which may be made in the form of an open cap located on top of the supporting frame or shelf 1. In the embodiment shown I have secured two pairs of terminals 32 which are supported in diameters at right angles to each other and extend down into the cap so that the rod 30 will pass in proximity to the terminals 32 located at opposite ends of each diameter at the same time. This completes the circuit across the terminals and in the particular arrangement shown in the diagram it permits the reduction of the resistance of the circuit of the current which is to be rectified. The cap 33 is preferably made adjustable. It may be secured to the shelf 1 by means of a slot in the laterally extending bearing 34 which is secured to the frame 1. The cap 33 may be turned and the position of the terminals relative to the conductor 30 and the axis of the shaft 14 adjusted so that the conductor will pass the terminals at predetermined points in the changes of the current actuating the motors. The cap and terminals may be secured in their adjusted positions by any suitable means. In this particular case they may be secured in their position by means of tightening the bolts in the slot.

The electromagnetic cut-out is provided which opens the circuit of the potential current when there is a flow of an abnormal amount of current. The electromagnetic cut-out or circuit controller 67 controls the circuit of the motor and the circuit of the rectifier system. It is shown in Figs. 5, 6, 7.

Cross beams 74 and 75 of non-magnetic material are supported on the poles of the magnet 68. The beams 74, 75 are secured in position by means of any suitable means such as the screw 76 and the nuts 77. Pivot points 78 are secured in the cross beams and secured in their adjusted position by means of the nuts 79. The pivot points 78 support the armature 73. The armature is mounted on the pin 80 and secured thereto by means of the set-screw 81. The armature is adapted to rotate on the pivot points 78 when it is actuated by the poles of the magnet. Eccentric shoes or tapering poles 82 are located at the extremity of the armature. The shoes may be made in any shape in order to cause the armature to rotate through a considerable angle. I have shown the shoes or poles as tapering and extending over an angle which is described by the armature when rotated. They are moreover cam-shape so that the distance between the poles of the armature and the poles of the magnet will be reduced upon the operation of the magnet whereby the reluctance will also be reduced. This will cause the magnet to move the armature through a considerable angle.

The arm 70 is mounted on the pin 80 and is adapted to rotate thereon. Means is provided for limiting the movement of the arm 70 relative to the armature 73. Any suitable means may be used but I have shown an adjustable means consisting of a plate 96 which is mounted on the armature 73 and may be turned about the pin 80 and secured in any desirable position by means of the clamps 83 which clamp the plate to the armature. The plate 96 is provided with pins 84 which are located on opposite sides of the arm 70. The arm 70 is thus permitted to freely move between the pins 84. The sleeve 72 located on the arm 70 is adapted to force the spring lips 85 apart substantially at the completion of the motion of the armature, the sleeve being forced between the lips. The supporting frame 86 of the spring lips 85 is attached to one of the poles of the magnet. Contacts 69 are supported on the springs 85 and are insulated therefrom. The springs 85 are secured to the supporting frame 86 by means of the clamp 87 which may be provided with a pin 88. A spring 89 adapted to spread the ends of the spring and cause the lips to come together and the contacts to close, may be located between the springs. The movement of the arm 70 is also limited in its extent by the adjustable stop 90 which is supported in the frame 91. The frame 91 is secured to the pole of the magnet by means of the screw 92. During the operation of the motor and the rectifying system, the arm 70 is placed in contact with the stop 90 so that the small ends of the tapering poles of the armature are located near the poles of the magnet. When the magnet becomes energized an appreciable amount by the current from the storage battery 42 it will rotate the armature. One of the pins 84 will press against the arm and move it, giving to the arm considerable momentum which will cause it to swing around and open the switch 69. The momentum of the arm will cause it to pass between the springs 85 and open the switch 69 thereby opening the motor circuit which passes through the switch 69, the magnet 66, the rheostat 65 and the coil 46. This discontinues the operation of the moving conductor 30 and consequently discontinues the formation of the arcs between the electrodes 43.

A means may be provided for adjusting the inertia of the arm. I have shown a means for causing the energy to be taken up by an inert mass which requires an interval of time to give the mass momentum. In order to accomplish this a weight 93 is supported on the arm 70. The weight 93 may be moved along the arm 70 to adjust its lagging effect. It may be secured in its adjusted position by means of the screw 94. If the magnet 68 is energized for an appreciable length of time the arm 70 will be thrown to one side at a rate which will vary according to the position of the weight and the switch will be opened.

Referring to Fig. 9 which is the diagram showing the system that may be used for the rectification of an electric current or electric impulses, 40 is the source of current to be rectified. It may be a transformer which is connected to the line and which may be connected to the rectifying system by means of the switch 41. The rectified current may be used for any suitable purpose and operate on any translating device, but I have shown by way of illustration a storage battery 42 that is charged by the rectified current. The storage battery may be located in the return of the circuit connected to the source of the current. The electrodes 43 and the high resistance body 44 and the impedance coil 45 may be located in one part of the circuit. The resistance of the circuit is greatly reduced by rendering the medium or space between the electrodes conductive and cutting the resistance out of the circuit. The electrodes 43 are separated sufficiently to prevent the potential of the current to start the current flowing across the electrodes, but if an arc is started across the electrodes by a spark or otherwise the potential is sufficient to maintain the arc or cause the current to flow over the arc that may be formed. The arc is formed at a particular time in the changes of the current, that is, the arc is established when the potential is of one kind which causes the current to flow in one direction. When a plurality of pairs of electrodes is used, the circuit is divided accordingly and each part is provided with a pair of electrodes and the translating device is located, preferably, in the common return. The arc is then started across one pair when the potential is of one kind and through the other pair when the potential is of the other kind. In the changes of the potential the current ceases to flow when the counter-electro motive forces are about equal to the impressed potential. The fields of the impedance coils 45 also operate to regulate the flow of the current across the electrodes. To start the arc a source of high potential current which may be obtained by a branch leading from the transformer 40 or source of current and induced in a transformer, such as that shown at 46, is discharged across the electrodes. In the case shown it is discharged alternately first across one pair of electrodes and then across the other pair of electrodes. A condenser 47 (see Fig. 10) or a pair of condensers (see Fig. 9) may be connected across the terminals of the secondary coil 48 and may be discharged across the gaps between the terminals 32 and conductor 30 and the gaps between the electrodes 43 as the current changes.

The relation between the fluctuation of the current and the conductor 30 is maintained a constant by means of a synchronously operated device. The conductor 30 is attached to the shaft 14 which is actuated by the motor device as heretofore described. The stator coil 5 of the synchronous motor is connected to the secondary 49 of the transformer 46 at the point 50 and to the terminal 51. The stator coil 22 of the induction motor is a split phase coil comprising two coils 52 and 53. The coil 52 is provided with a resistance coil 54 and the coil 53 is provided with an inductance coil 55. The coils are connected together as shown and to the terminal 51 of the secondary 49, and also to the switch 56 which is adapted to make contact with the terminal 57 and the contact 50. When the conductor 30 is first started the switch 56 is moved over to the terminal 57 against the tension of the spring 58 until the rotation of the conductor 30 and the rotors of the motors are the same as that of the frequency of the changes of the current which is judged by the effect of the current as it passes between the electrodes, that is, it is judged by the sound and appearance of the sparks and arcs. The spring 58 is then allowed to pull the switch 56 against the stop 59 which connects the induction motor with the contact 50 and reduces the potential. The switch 56 thus makes connection between the split phase coil 22 and the point of high potential of the transformer coil 49, by making electric connection with the contact 57. This impresses on the windings 52 and 53 a high electromotive force to produce a comparatively large starting torque, so as to bring the rotating members nearer to synchronism, thereby assisting the rotatable member 30 to get into step. When this is accomplished the switch 56 is then allowed to make electric connection with the contact 50 which connects the coils 52 and 53 with a point in the transformer coil 49 having a lower potential. The lower electro motive force is sufficient to keep the rotating member 30 in step with the current that is rectified. The conductor 30 continues to move synchronously with the fluctuations of the current, the speed being regulated to a certain extent by the induction motor. The coil 12 of the synchronous motor may be connected with any source of direct current. I have shown by way of illustration that it may be connected to the storage battery which is in this case operated upon.

The switch 41 may be of the usual three-bladed type but I have shown a double switch wherein the middle blade may be closed independently, but which will be opened on the operation of the two remaining blades, after the manner well known in the art. The switch is provided with a handle 60 which is adapted to close the contacts 61 and is engaged by the end of the lug 62 which is attached to the cross beam 63. The handle 64 may thus be operated to close the contacts of two of the blades and the handle 60 may be operated subsequently to close the contacts of the remaining blades. When the handle 64 is operated to open the switch the three blades are operated. In starting the operation of the system the two blades are closed by the operation of the handle 64, the third blade is, at the proper time in the fluctuating of the current, closed by the operation of the handle 60. This is done after the conductor 30 is moving in synchronism with the current.

The system is grounded by means of the ground connections 71 which leads from the middle leg or return of the system. This keeps that portion of the system at substantially zero potential. The ground may be connected to the electrodes when some devices are operated on.

The scheme for causing the current to be rectified is controlled by the resistance 65, the cut out 66 and the circuit controller 67. Resistance 65 is an adjustable resistance. The cut out 66 operates continuously while the current is flowing through the primary coil 46, but if for any reason this current should at any time be discontinued such as by the operation of the switch 41, or separation of the contacts 69, it will also open the circuit of the primary coil 46. It operates as a safety switch. The electric controller 67 operates to regulate the flow of the current through the translating device and when the storage battery 42 is charged the controller 67 will be actuated, but the controller 67 will not be actuated by any temporary changes of the current or mechanical vibrations. The controller 67 controls the synchronously operated device 30 which allows the current to flow at the proper time through the circuit of the translating device 42 by controlling the circuit of the primary 46 which induces the currents in the coils 52, 53, 54 of the motor and produces the high potential pulsations in coil 48 which spark across the electrodes 43. The coils of the electromagnet 68 are connected to the terminals of the battery 42. The contacts 69 are connected in the circuit of the transformer 46. When the arm 70 is actuated sufficiently the insulating ring or collar 72 is forced between the spring lips 85 and the contacts are opened, thus opening the circuit of the transformer. The battery 42 may be shunted by the reactance coil 96' to keep the potential of the return nearly constant.

The above is a description of one embodiment of my invention. The construction and arrangements of the parts may be modified for various uses by those skilled in the art without departing from the spirit of the invention.

What I claim as new and desire to secure by Letters Patent is as follows:

1. In a rectifier of alternating currents, the combination of a source of alternating current, a pair of circuits having a common return and a translating device located in the common return of the said circuits, means for completing the said circuits alternately through the said common return, the said means having a conductor, a synchronous motor and an induction motor mechanically connected together, the stators of the motors being connected in parallel and means for changing the potential of one of the said stators.

2. In a rectifier of alternating currents, the combination of a source of alternating current, a pair of circuits having a common return and translating device located in the common return of the said circuits, means for completing the said circuits alternately through the common return, the said means having a conductor, a synchronous motor and an induction motor mechanically connected together, the stators of the motors being connected in parallel, means for changing the potential of the synchronous motor.

3. In a rectifier of alternating currents, the combination of a source of alternating current, a pair of circuits connected to said source having common return, and a translating device located in the common return, means adapted to complete the said circuits alternately and having a conductor and a synchronizing device, the said parts being mechanically connected together, means for reducing the electromotive force on the actuating coils of the said synchronous device when the said conductor reaches synchronism with the alternating current.

4. In a rectifier of alternating electric currents, the combination of a source of alternating current, a pair of circuits connected to said source having a common return, a pair of electrodes connected in the said circuit, high resistance bodies connected in shunt with the said electrodes and a translating device connected in the common return to the said circuits and a transformer having two secondaries, one of the said secondaries having a large number of windings to produce a high potential and connected with the said electrodes and terminals connected to the said transformer and to the said electrodes and a rotatable conductor movable across the said terminals to complete the high potential circuit from the transformer to the electrodes alternately and a synchronizing device having actuating coils, the second secondary of the said transformer connected to the said actuating coils, and a switch for including one or more sets of coils to the second secondary for impressing relatively high or low potential on the actuating coils.

5. The combination of an induction motor, a synchronous motor, said motors connected in parallel, a shaft rotatable by the joint operation of said induction motor and said synchronous motor, and a rectifying device, connected in parallel with the motors, provided with fixed parts and a rotatable part driven by said shaft.

In testimony whereof, I have signed my name to this specification, in the presence of two subscribing witnesses.

THOMAS J. MURPHY.

Witnesses:
  R. M. T. LARIN,
  G. S. GAYLOR.